(12) United States Patent
Li et al.

(10) Patent No.: US 9,260,347 B2
(45) Date of Patent: Feb. 16, 2016

(54) SPRAYABLE STRAIN HARDENING BRITTLE MATRIX COMPOSITES WITH FIRE-RESISTANCE AND HIGH DUCTILITY

(71) Applicant: THE REGENTS OF THE UNIVERSITY OF MICHIGAN, Ann Arbor, MI (US)

(72) Inventors: Victor C. Li, Ann Arbor, MI (US); Qian Zhang, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/667,821

(22) Filed: Mar. 25, 2015

(65) Prior Publication Data

US 2015/0274594 A1 Oct. 1, 2015

Related U.S. Application Data

(60) Provisional application No. 61/969,957, filed on Mar. 25, 2014.

(51) Int. Cl.
*C04B 28/00* (2006.01)
*C04B 28/28* (2006.01)

(52) U.S. Cl.
CPC .................................. *C04B 28/28* (2013.01)

(58) Field of Classification Search
None
See application file for complete search history.

(56) References Cited

U.S. PATENT DOCUMENTS

| | | | | |
|---|---|---|---|---|
| 5,641,584 | A * | 6/1997 | Andersen | B28B 1/00 106/675 |
| 8,172,938 | B2 * | 5/2012 | Alright | C04B 26/02 106/672 |
| 2007/0027224 | A1 * | 2/2007 | Cowan | C04B 16/08 521/56 |
| 2011/0206471 | A1 * | 8/2011 | Doshi | C04B 14/064 408/1 R |

* cited by examiner

*Primary Examiner* — Kara Boyle
(74) *Attorney, Agent, or Firm* — Harness, Dickey & Pierce, PLC

(57) ABSTRACT

A formulation of a spray applied fire-resistive engineered cementitious composite (SFR-ECC) which is made by addition of polymeric fibers, vermiculite, bonding agent and lightweight aggregates to cement and water. The SFR-ECC formulation is made in wet cement and can be spray-applied. The durable SFR-ECC exhibits thermal conductivities sufficient for fire resistance with increased tensile ductility and impact resistance.

15 Claims, 4 Drawing Sheets

SPRAYABLE STRAIN HARDENING BRITTLE MATRIX COMPOSITES WITH FIRE-RESISTANCE AND HIGH DUCTILITY

CROSS-REFERENCE TO RELATED APPLICATIONS

This application claims the benefit of U.S. Provisional Application No. 61/969,957, filed on Mar. 25, 2014. The entire disclosure of the above application is incorporated herein by reference.

FIELD

The present disclosure relates to cement-based composites and, more particularly, relates to strain hardening brittle matrix composites with fire-resistance and high ductility.

BACKGROUND AND SUMMARY

This section provides background information related to the present disclosure which is not necessarily prior art. This section also provides a general summary of the disclosure, and is not a comprehensive disclosure of its full scope or all of its features.

As it is known, steel structures are vulnerable under fire hazards; external passive fire protection is thus needed to achieve sufficient fire resistance. Spray-applied fire-resistive materials (SFRM) are one of the most commonly used passive fire protection material for steel structures in North America. SFRM are predominately cementitious (many are Portland cement-based) lightweight plaster materials that are sprayed onto the steel surface. They have very low thermal conductivity so that they are highly effective in delaying the temperature rise in the steel and protect the steel structure against fire related failures. Apart from the central function as a fire-protection material, SFRM offer many additional advantages including low self-weight, ease of construction facilitated by sprayability and most importantly, cost effectiveness; therefore, SFRM are widely used to protect steel structures in North America.

Despite all the advantages, the performance of SFRM also naturally depends on their durability characteristics (the ability to stay on the steel surface), which are often called into question. Studies have shown that SFRM could easily delaminate or get damaged during extreme loading events, including earthquakes or impacts. Under normal service life, regular mechanical maintenance work or construction could also disturb and damage the existing SFRM and repair is then required. Failure to restore the fire protection in a timely manner could lead to a reduction in the fire resistance of the steel structures. This problem becomes more prominent under multi-hazards such as post-earthquake/impact fire. The lack of durability is then recognized as the major issue associated with conventional SFRM.

Adhesion and cohesion are two major durability characteristics for SFRM. Adhesion refers to the interfacial bond between SFRM and steel substrate and sometimes could be enhanced through preparation of the steel surface and applying external bonding agent. Cohesion refers to the material's resistance to delamination (often observed as a thin layer of SFRM material still attached to the steel after the two bulk material separated in a shear type failure) and fracture. Cohesion is an intrinsic material property that is largely dependent on the strength and ductility of the material itself. SFRM are inherently brittle material with very low strength, especially tensile strength; therefore conventional SFRM mainly rely on adhesion to maintain the integrity of the fire protection. Recent study demonstrated that even with adhesion enhanced by external interfacial bonding agent, delamination of SFRM due to poor cohesive property was still observed when subject to impact load. The poor cohesive performance represents the major bottleneck for conventional SFRM.

To overcome the inherently brittle and low cohesive property of SFRM, recent effort has been made to adopt Engineered Cementitious Composites (ECC) technology into the design of SFRM according to the principles of the present teachings. ECC is a class of High Performance Fiber Reinforced Cementitious Composites (HPFRCC) that has been developed over the last decade as a ductile alternative to the conventional concrete. Unlike the conventional cement-based material, ECC exhibits metal-like pseudo strain-hardening behavior with strain capacity up to 3-5% under uniaxial tension. Such high tensile ductility is reached by forming multiple fine cracks (typically less than 100 μm wide) along the specimen. The fracture resistance of ECC is considered similar to aluminum. With these desirable characteristics, ECC possesses inherently high cohesive property to conventional SFRM. ECC developed for structural applications, however, do not possess the necessary thermal characteristics required for fire-protection purpose. Adopting the micromechanics-based design methodology underlying ECC technology in combination of microstructural tailoring for macro-thermal property control, spray-applied fire-resistive ECC (SFR-ECC) has been developed as a durable alternative to the conventional SFRM.

The present disclosure is a comprehensive introduction of SFR-ECC. The material composition, durability properties (under both static and high rate load), and functionality properties (thermal conductivity and sprayability) are further presented. The cohesive characteristics of SFR-ECC provide extra durability mechanisms in addition to interfacial adhesion, and its sprayability allows versatile construction applications of SFR-ECC, as will be discussed herein.

An objective of the present teachings is to develop a new class of high-performance fiber reinforced cement-based composites (HPFRCC) that possess very low thermal conductivity and high tensile ductility. Presently there are cement-based materials that separately possess very low thermal conductivity (conventional spray-applied fire-resistive materials) or high tensile ductility (engineered cementitious composites); however, there is no material that possesses both properties. The present teachings provide a newly developed composite material with composition that leads to a combination of low thermal conductivity and high ductility. The material claimed herein presents a unique opportunity of more durable fire protection for steel structures and enhanced safety of steel structures under multi-hazard such as impact/earthquakes followed by fire.

In other words, according to the principles of the present teachings, a cement-based fire-resistive material with high tensile ductility and low thermal conductivity is provided. This invention represents the culmination of two cement-based material, namely those of very low thermal conductivity and those of very high tensile ductility into a single composite system. The combination of such properties are achieved by judicious selection of the lightweight aggregate (of small size and smooth shape) and fibers (type, aspect ratio, volume content) under the guidance of heat transfer theory and micromechanics analysis. In doing so, the new Fire-Resistive Engineered Cementitious Composite (FR-ECC) exhibits greatly enhanced tensile ductility over conventional cement-based Spray-applied Fire-resistive Materials (SFRMs). This makes it a candidate material as durable fireproofing material for steel structures when impact or earthquake loads are of concern or to generally improve the durability of the fire protection. This invention can be used as insulation board system or as sprayed-on fireproofing material.

Due to the high durability of SFR-ECC, it is feasible to spray applied this material onto steel elements prior to on-site assembly, making the factory spray quality control better compared with on-site spraying, and speeding up the steel building construction process as a result. This feature is not feasible with conventional SFRMs since they will crack and delaminate from the steel members during transport to and assembly on site.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
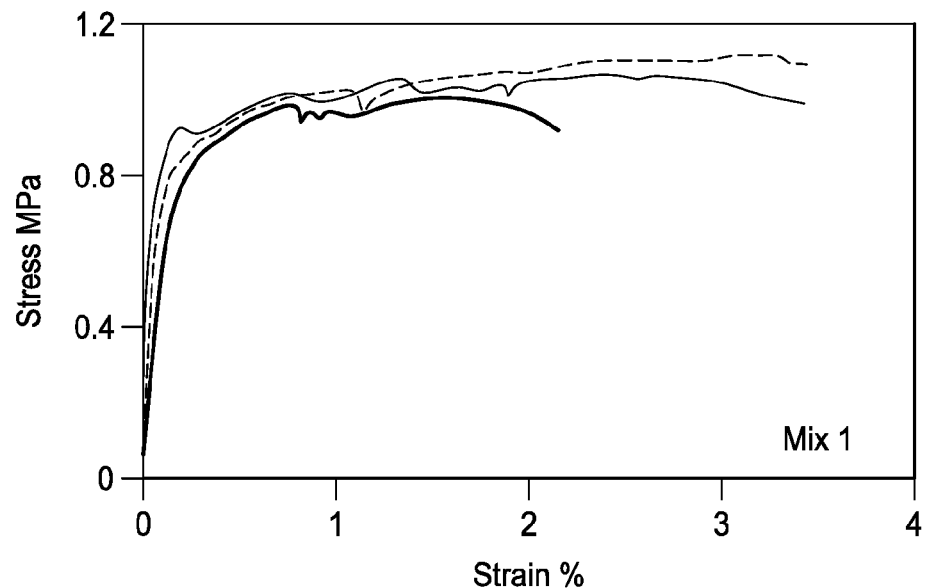
FIGS. 1A and 1B are graphs illustrating the ductile tensile behavior of Mix 1 and Mix 2, respectively.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As the most commonly used passive fire protection for steel structure in North America, spray-applied fire-resistive materials (SFRM) are often called into question due to their poor durability (cohesive and adhesive) performance. Being an inherently brittle material with very low tensile strength, SFRM tend to dislodge and delaminate under extreme loading conditions as well as service loads. Such loss of fire protection greatly endangers the steel structures, especially under multi-hazards like post-earthquake/impact fires. Adopting the Engineered Cementitious Composites (ECC) technology, a ductile Portland cement-based SFRM, namely spray-applied fire resistive ECC (SFR-ECC) has been developed as a durable alternative to the conventional SFRM. SFR-ECC possesses much better adhesive and cohesive performance under both static and high rate loading compared to conventional SFRM. With the highly cohesive nature, SFR-ECC offers extra durability mechanisms in addition to interfacial adhesion and therefore has more robust durability performance. Potential applications of SFR-ECC for prefabrication of passive fire protection are further provided.

1. Materials 1.1 Material Composition and Processing

In some embodiments, the mix composition of SFR-ECC can comprise of Type I Portland Cement, water, super fine grade vermiculite (particle size less than 1.5 mm), microspheres, acrylic latex-based bonding agent, super plasticizer (SP), viscosity modifying agent (VMA) and High Tenacity Polypropylene (HTPP) fiber. Microspheres could be glass bubbles (GB) or fly ash cenospheres (FAC) with maximum particle size less than 100 µm. These two kinds of microspheres both have hollow spherical structure with air entrapped inside. Glass bubbles are manufactured using soda-lime-borosilicate glass and fly ash cenospheres are industrial byproduct from combustion of the coal. They both have good thermal stability under elevated temperature, especially the fly ash cenospheres, making them suitable for high temperature applications. Two mixtures of SFR-ECC are presented in Table 1. In the presented mixtures, 1.5% (by total volume of the mix) HTPP fiber are used. The composition are carefully tailored considering multiple design targets. The dry density of Mix 1 and 2 are both around 550 kg/m$^3$. The main difference between the two mixes is in the type of microsphere adopted (GB vs FAC).

TABLE 1

Mix proportion of SFR-ECC

| | Cement | Water | Vermiculite | Microspheres | Bonding agent | SP | VMA |
|---|---|---|---|---|---|---|---|
| Mix 1 | 1 | 1.08 | 0.3 | 0.2 (GB) | 0.12 | 0.01 | 0.02 |
| Mix 2 | 1 | 1.33 | 0.3 | 0.8 (FAC) | 0.07 | 0.03 | 0.05 |

The preparation of SFR-ECC follows a standard ECC mixing procedure. Using a shear type Hobart mixer, all solid ingredients including cement, vermiculites and microspheres are dry mixed for 3 minutes. Water, bonding agent, SP and VMA are then added into the dry mixture and mixed for another 3 minutes. HTPP fiber are slowly added into the mortar and mixed for 5 minutes until fibers are well dispersed.

SFR-ECC could be either troweled or sprayed onto the steel surface. In addition, fire-resistive boards could be made from casted SFR-ECC as well, which will be discussed in the later section. For spray-on application, a wet-spray process is followed. Peristaltic pump is used to avoid excessive fiber clumping during the pumping process. After mixing, the fresh mixture is transferred to the peristaltic pump and then sprayed through the spray gun directly onto the steel surface. It may require several sprays until the designed thickness is achieved.

1.2 Cohesive Characteristics

Cohesive characteristics are highly related to strength and ductility of the material. Passive fire protection material is typically considered a nonstructural component and is typically loaded via deformation of the structural steel substrate. Thus, tensile ductility is considered the key property of the cohesive characteristics. With higher tensile ductility, the fire protecting surface coating material will be able to accommodate larger deformation of the steel substrate and absorb more energy from accidental impact without fracture or substantial cracking. This is critical under extreme events like earthquakes and impacts as well as under normal service condition. Based on this, the tensile property, tensile strain capacity in particular, is used to evaluate the cohesion of SFR-ECC.

Figure 1B:
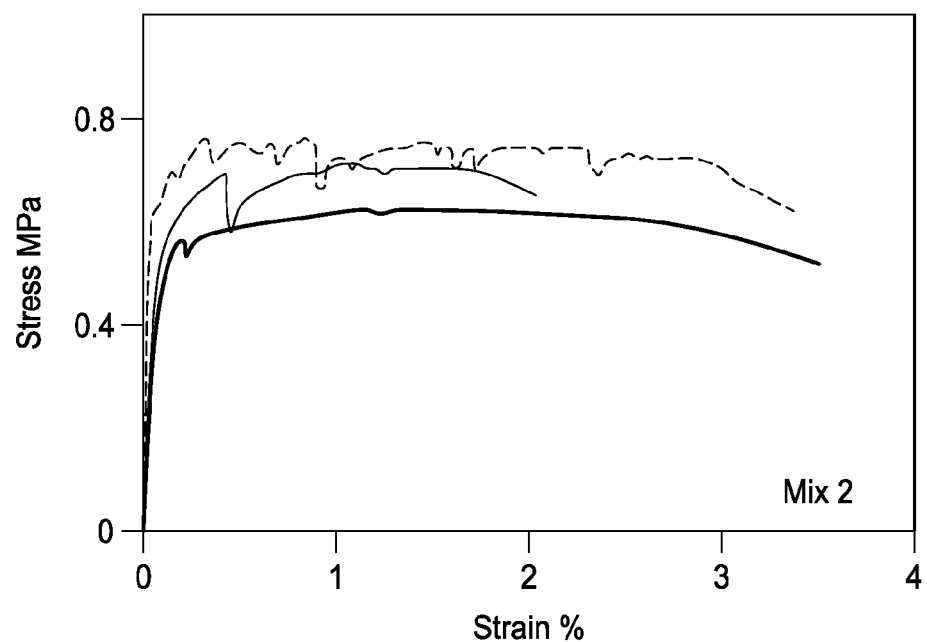

The tensile stress-strain curves of SFR-ECC Mix 1 and 2 obtained from uniaxial tension test on dogbone-shaped specimens are plotted in FIG. 1. Specimen size and loading configuration can be found in the reference. As shown in the figure, both mixes achieve high tensile strain capacity greater than 2%, which is about 200 times larger than that of conventional cement-based material. Tensile strengths of SFR-ECC are also considered high in the context of passive fire protection material; especially Mix 1 has ultimate tensile strength above 1 MPa. As a reference, normal SFRM of similar density range exhibit tensile strength around 0.1 MPa with almost no inelastic strain capacity. It was noticed during the processing of the material that Mix 1 showed better workability and required less rheology modifying admixtures (SP and VMA). This is associated with smoother surface and better quality control of glass bubbles since glass bubbles are manufactured product while fly ash cenospheres are industrial waste material. Nevertheless, SFR-ECC Mix 1 and 2 both exhibit much higher cohesive property than conventional SFRM and are considered durable alternatives to SFRM.

SFR-ECC is aimed at enhanced durability even under extreme loading conditions, thus the cohesive property of SFR-ECC under high rate loading is also critical. Regular ECC material could have rate sensitivity under dynamic loading as found in previous research. According to the study, regular ECC produced with PVA fibers shows a reduction in tensile strain capacity when strain rate increases from $10^{-5}$ s$^{-1}$ to $10^{-1}$ s$^{-1}$. Although another study indicates that lightweight ECC material and ECC produced with hydrophobic polymer fibers (including polypropylene fibers) are not sensitive to loading rate, it is important to ensure that SFR-ECC maintains desirable tensile performance and cohesive characteristics under high rate loading.

Figure 2:
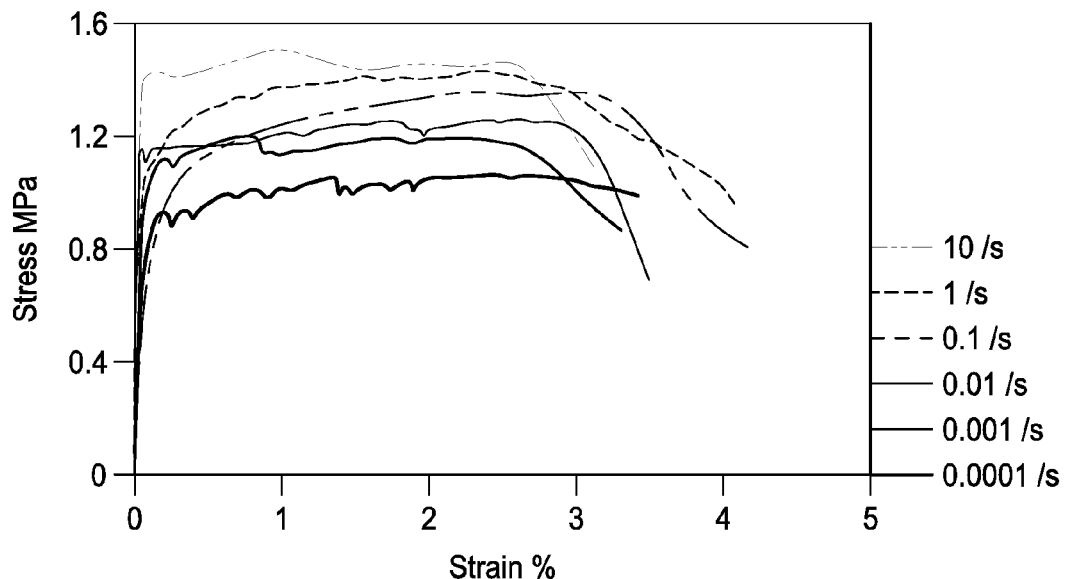
FIG. 2 is a graph illustrating ductile tensile behavior of SFR-ECC (Mix 1) under different strain rates.

Representative tensile stress-strain curves of SFR-ECC (Mix 1) under different strain rates are plotted in FIG. 2. The investigated strain rates range from $10^{-4}$ s$^{-1}$ to $10^1$ s$^{-1}$, covering static, earthquake and impact loads. As the data suggests, the tensile strengths of SFR-ECC, including both first cracking strength and ultimate tensile strength, increase as the loading rate goes up. The tensile strain capacity all maintains above 2%. The tensile strengths and strain capacity under all strain rates are summarized in Table 2. The change in tensile strain capacity is a result of combining effects of crack number and crack width change. This can be further traced to stiffness and strength increase of the polymer fibers under high rate loading. Nevertheless, the average crack width remains below 50 μm under all investigated strain rates. The relative insensitivity of SFR-ECC to strain rates ensures desirable behavior of SFR-ECC (high cohesion) under high rate loading.

TABLE 2

Tensile strengths and strain capacity of SFR-ECC (Mix 1) under different strain rates

| Strain rates s$^{-1}$ | First cracking strength MPa | Ultimate tensile strength MPa | Tensile strain capacity % |
|---|---|---|---|
| $10^{-4}$ | 0.87 ± 0.01 | 1.01 ± 0.07 | 2.4 ± 0.9 |
| $10^{-3}$ | 1.08 ± 0.15 | 1.22 ± 0.10 | 2.3 ± 1.0 |
| $10^{-2}$ | 1.20 ± 0.07 | 1.30 ± 0.08 | 2.4 ± 0.6 |
| $10^{-1}$ | 1.26 ± 0.11 | 1.41 ± 0.12 | 2.9 ± 0.9 |
| $10^{0}$ | 1.25 ± 0.08 | 1.49 ± 0.07 | 2.2 ± 0.8 |
| $10^{1}$ | 1.43 ± 0.03 | 1.54 ± 0.12 | 2.2 ± 0.6 |

For conventional SFRM, compressive strength is typically used to represent the strength level of different material. As a reference, the compressive strength is 3.5 MPa for SFR-ECC Mix 1 and 2.8 MPa for Mix 2. Such compressive strengths lie at the higher end of the compressive strength of conventional SFRM, which ranges from 200 kPa to 4 MPa. Being a nonstructural material, the compressive strength of SFR-ECC is well above all specified requirements.

1.3 Adhesive Characteristics

Adhesion is another important aspect of durability for SFRM. The adhesive property of SFR-ECC is evaluated using the adhesive fracture energy of the SFR-ECC/structural steel interface in peeling mode. In some specimens, the interfacial crack kinks into the SFR-ECC and delaminates with a thin layer of SFR-ECC attached to the steel strip after the peel-test. In this case, the measured adhesive energy is considered an effective one. The measured adhesive energy is 104.3±15.4 J/m² for SFR-ECC Mix 1 and 310.4±45.3 J/m² for Mix 2, which is about an order of magnitude higher than that of conventional SFRM of similar density used as control specimen in the study (11.1±1.4 J/m²). The significantly greater interfacial adhesion of SFR-ECC over conventional SFRM could be attributed to two factors: modification of the interfacial transition zone due to the addition of acrylic latex-based bonding agent in the mixture and polymer fiber bridging effect. Adhesion is the primary durability mechanism for SFRM. Although for SFR-ECC, the highly cohesive nature offers extra durability mechanisms, high adhesion is still considered desirable.

It is worth mentioning that the adhesive energy shows rate dependency. This is a typical phenomenon for fiber bridged fractures since the fiber bridging strength increases as the loading rate increases. For example, at a loading rate 40 times higher than the static loading rate (0.5 mm/min) in the adhesion test, the adhesive energy for SFR-ECC (Mix 1) increases to 193.6±15.2 J/m². The sharp increase in adhesive energy also ensures high adhesion under high rate loading.

1.4 Functional Characteristics

Figure 3:
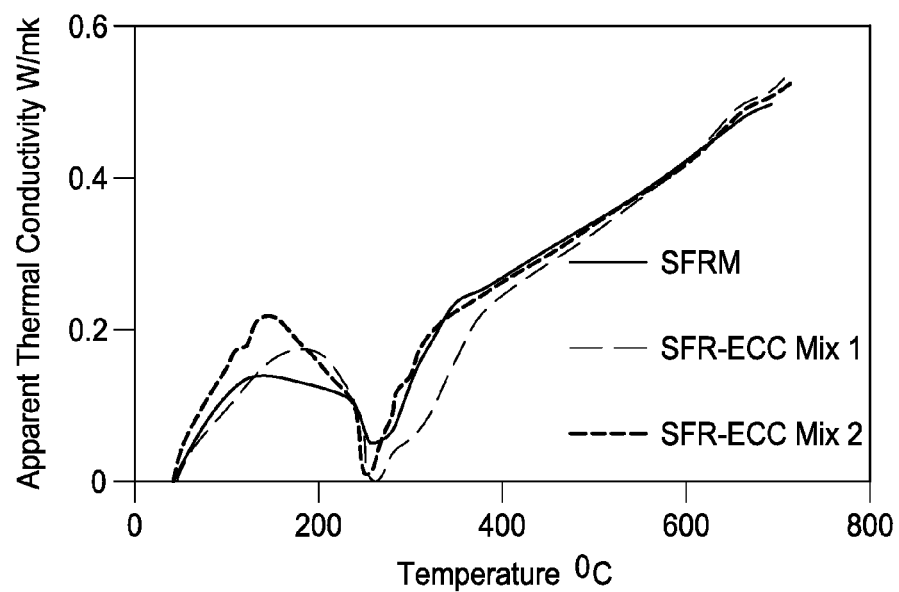
FIG. 3 is a graph illustrating the thermal conductivity of SFR-ECC (Mix 1), SFR-ECC (Mix 2) relative to SFRM.

Thermal property is essential for SFR-ECC as a passive fire protection material. The measured apparent thermal conductivity (in accordance to ASTM E2584) of both SFR-ECC mixes are fairly similar to that of the commercially available SFRM of similar density over the major temperature range investigated. The measured thermal conductivity as a function of temperature is plotted in FIG. 3. The fire resistance of SFRM mainly comes from low thermal conductivity, therefore, SFR-ECC is considered satisfactory as a fire protection material regarding its fire resistance.

Sprayability of SFRM often leads to ease of construction. It is worth noting that SFR-ECC can be applied by troweling or other methods, which will be further discussed in a later section of this paper, but being sprayable is always beneficial for offering versatility in the construction. Direct spray test on SFR-ECC suggests that both SFR-ECC mixes can build up to 40-45 mm thickness on the structural steel surface during two consecutive sprays. Typical design thickness of SFRM is 10-50 mm in most case. Therefore, such sprayability is considered sufficient for most field applications.

With satisfactory thermal insulating property and sufficient sprayability, the functionality of SFR-ECC as SFRM is ensured. It is very critical that the functionality is not sacrificed for durability performance.

Mechanisms of Durability

The durability of current SFRM is typically achieved through strong adhesion. The bond requirement for SFRM in current standards does not differentiate between adhesive bond and cohesive bond. However, the standard test (ASTM E736) is typically conducted on a panel shape specimen where SFRM is pulled away from a flat steel surface. This could neglect the potential contribution from adjacent materials that are mechanically bonded through anchoring configurations like angles or edges. Since the cohesive strength of SFRM is very low, this is probably reasonable. However, for SFR-ECC, the standard test may underestimate the actual durability.

The unique cohesive characteristics of SFR-ECC offers new possibilities concerning durability. One concept is based on a "wrapped-around" configuration. This refers to the case that the steel member is entirely wrapped around by the SFR-ECC, such that the SFR-ECC forms a continuous enclosure. Under such condition, SFR-ECC could maintain its continuity and integrity under mechanical loads even when the adhesion between steel and SFR-ECC is lost. Thus, the "wrapped-around" durability concept provides an extra level of safeguard for steel members in addition to strong adhesive bonding between SFR-ECC and steel.

The "wrapped-around" configuration is not rare in the real applications. For most columns, the passive fire protection are applied in a "wrapped-around" manner. Fire protection on braces, trusses and in some case, beams could also be in the "wrapped-around" form. The highly cohesive "wrapped-around" configuration then provides extra durability mechanisms for those important structural members, preventing loss of insulation under various loads.

Low velocity impact test on SFR-ECC wrapped steel beam is used to confirm the "wrapped-around" idea. S4x7.7 I-beam wrapped around by 13 mm thick SFR-ECC (Mix 1) in the middle part was subject to low velocity impact tests. A weight of 14.5 kg was dropped freely from a height of 0.86 m onto the SFR-ECC wrapped steel beam. This level of impact did not cause any structural damage or permanent deformation in the steel beam and could be used to represent accidental impact during construction and maintenance work. In this test, the surface of the steel beam was deliberately oiled to eliminate the contribution of interfacial adhesion but focused only on the effectiveness of the "wrapped-around" concept of the SFR-ECC.

Figure 4A:
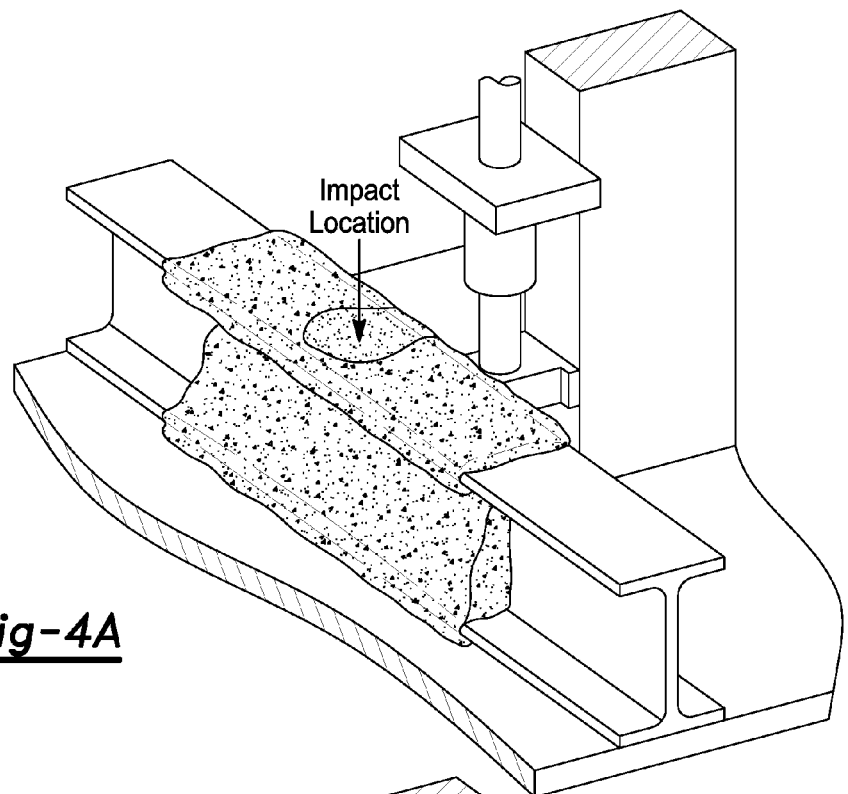
FIGS. 4A and 4B are photographs illustrating SFR-ECC and conventional SFRM after impact, respectively.
Figure 4B:
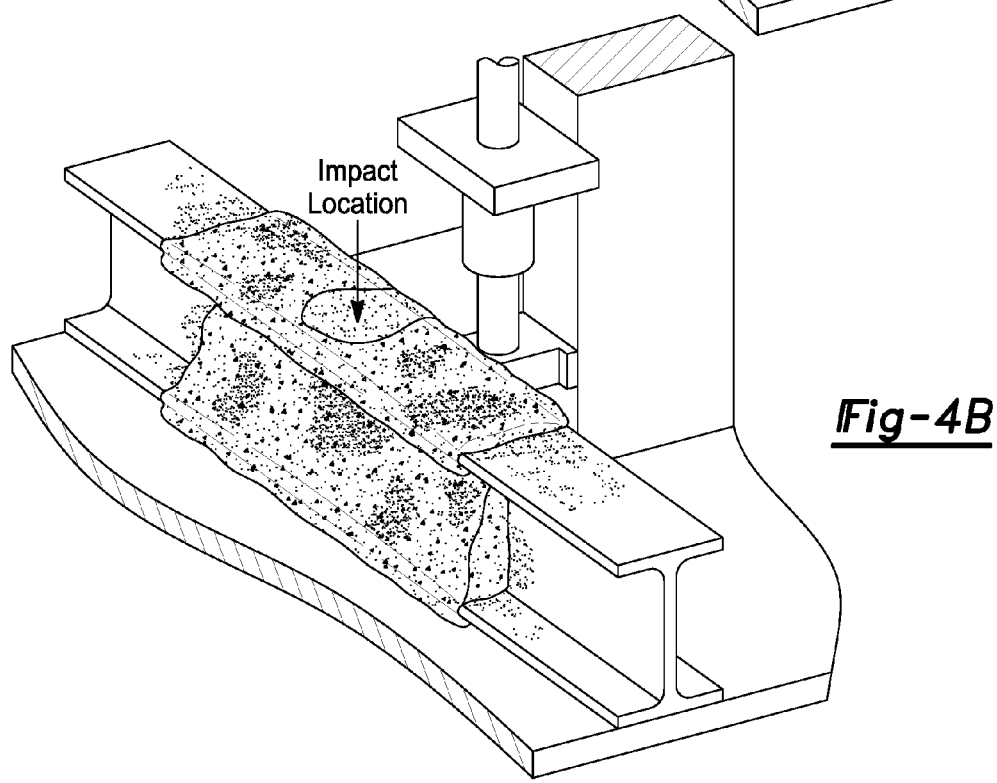
Figure 5:
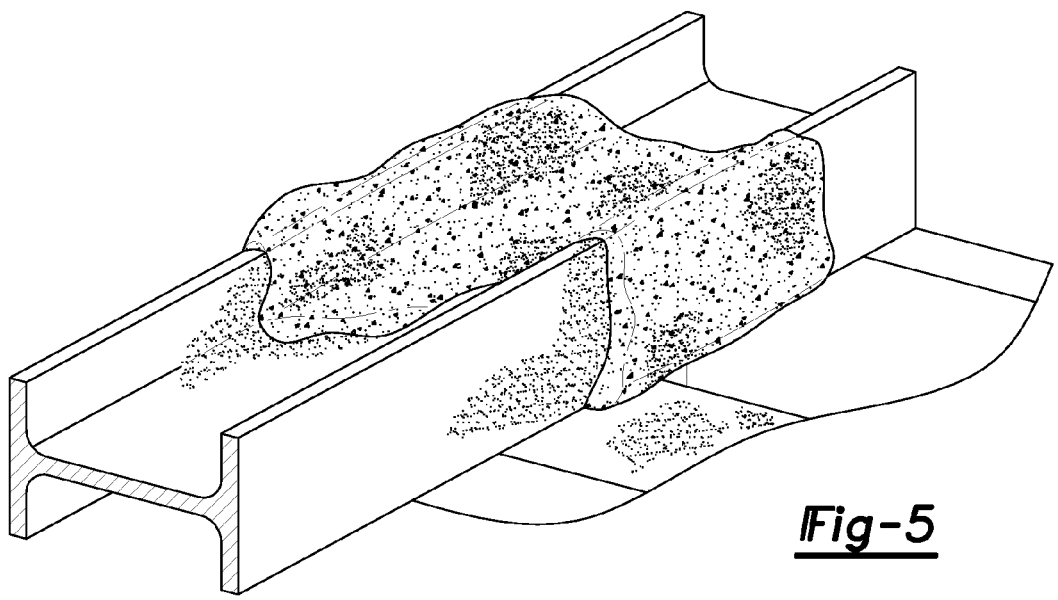
FIG. 5 is an enlarged photograph illustrating a bottom flange and damage to conventional SFRM after impact.

FIG. 4 (a) shows the condition of the SFR-ECC on the steel beam after 5 repeated impacts. From the photo, we can conclude that the integrity of the SFR-ECC was well preserved. There was no visible loss of fire protection material. As a control group, a commercially available SFRM of similar density range was also tested under the same impact loads. In this beam, SFRM was naturally bonded to the steel beam. The condition of the SFRM wrapped beam after 5 impacts is shown in FIG. 4 (b). It can be seen that SFRM on the flange were totally lost after the impacts, leaving only a very thin layer of cementitious SFRM on the steel surface. The SFRM on the web remained intact since the interface was parallel to the loading direction. Even with the presence of the interfacial adhesion, the integrity of the SFRM was not preserved. It was also observed that SFRM was lost piece by piece. (FIG. 5) The "wrapped-around" configuration did not prevent the SFRM from falling off. Therefore, this durable "wrapped-around" concept is only applicable for highly cohesive material like SFR-ECC.

Similar to the "wrapped-around" concepts, other configurations involving mechanical anchorage of SFR-ECC will also contribute to the durability. For example, edges, angles and even openings on structural members could serve as mechanical anchorage for SFR-ECC. SFR-ECC could hang onto those elements solely depending on its cohesive characteristics. In addition to these commonly existing anchors, additional clips and studs could also be used to provide extra anchorage for SFR-ECC if needed.

Given the extra durability mechanisms, SFR-ECC is more tolerable to local or even global adhesive failure. As previously stated, SFR-ECC exhibits very high interfacial adhesion to structural steel compared to conventional SFRM. However, as an interfacial property, adhesion is often subject to large variability. Many factors, such as the condition of the steel surface or application methods, could have noticeable influence on the adhesive property. Totally relying on interfacial adhesion, which is the case for conventional SFRM, could result in lower robustness of the system. In the case of local debonding (loss of adhesion), local failure is expected in conventional SFRM. In contrast, the SFR-ECC in the debonding area could hold in place with the help of adjacent SFR-ECC that are still firmly bonded or mechanically anchored to the steel. Therefore, with the highly cohesive nature, SFR-ECC is expected to show more robust durability behavior.

Other Potential Applications

SFR-ECC was designed as a spray-applied fire-resistive material for steel structures. Compared to conventional spray-applied fire-resistive materials, SFR-ECC exhibit significantly stronger mechanical property and bond to steel, and therefore possess much higher delamination and damage resistance. Adopting SFR-ECC can both prevent failure of the fire protection materials under extreme loading conditions (earthquakes and impacts) and generally improve the durability performance of the fire protection during service life.

Figure 6:
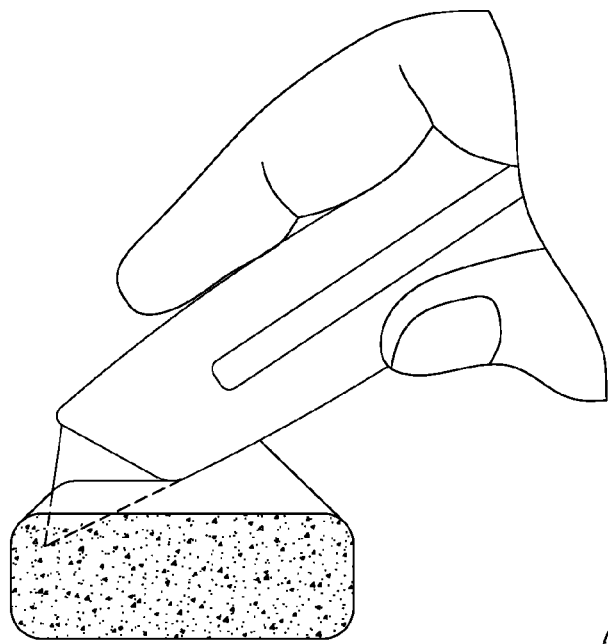
FIG. 6 is a photograph illustrating cutting of SFR-ECC using a craft knife.
Figure 7:
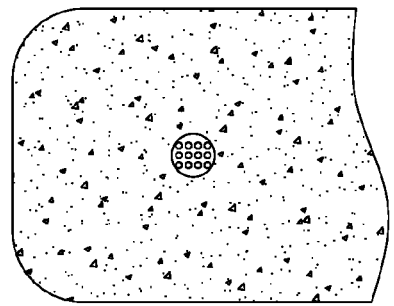
FIG. 7 is a photograph illustrating nailing of SFR-ECC without fracture failure.

Although SFR-ECC is developed as spray-applied fire-resistive material, it certainly should not be limited to spray-on applications. In addition to spraying, SFR-ECC also can be casted into different shapes and cut into different sizes using tile-saw, hand saw and even craft knives (FIG. 6). SFR-ECC could be drilled, bolted and nailed easily without fracture (FIG. 7). These properties allow greater versatility of SFR-ECC as a passive fire protection material.

One potential application of SFR-ECC is to apply SFR-ECC on steel members before they are assembled on the construction site. Conventional SFRM are applied on site after major constructions are finished. This is because conventional SFRM with poor durability and mechanical properties typically cannot handle the load during transportation and construction. The damage tolerance and high strength of SFR-ECC made this feasible. SFR-ECC could be applied onto the steel member off site by spraying or even casting. The pre-fireproofed steel members then can be assembled on site. On-site spraying (or troweling) is then only needed at a few locations such as connections. The quality of the fire protection, including uniformity, thickness and finish could be better controlled in this way and the pre-fireproofing process is also expected to save construction time and therefore construction cost.

Pre-cast fire-resistive board is another potential application for SFR-ECC. SFR-ECC can be casted into flat boards and other shapes as required, for example L-shaped or semi-circular elements. On the site, these boards or pre-cast shapes are installed onto the steel members and bolted, nailed or clipped together. Compared with the regular low tensile strength board material (such as gypsum board, calcium silicate board), SFR-ECC exhibits much higher fracture resistance under service and extreme loading events and generally much higher resistance against various environmental effects. Therefore, SFR-ECC could be a durable alternative to these fire-resistive boards.

In addition to fire-resistive applications, SFR-ECC can also be used as general thermal insulation material since they offer great thermal insulating effect under both ambient and elevated temperature.

Composition and Microstructure

The air voids structure is kept fine in SFR-ECC to maintain low thermal conductivity at high temperature. The air pores within SFR-ECC contains small number of air pores with size of 0.2-0.7 mm formed due to air entrainment and large number of air voids with size of 0.02-0.2 mm inside the lightweight aggregates.

Lightweight aggregate size is preferably small (e.g. less than 2 mm) and mostly with smooth-shape. Inert hollow microspheres with high temperature resistance are chosen as major lightweight aggregate in this invention. Such microspheres are composed of a material of high thermal stability, mostly chemically inert within cement based matrix, with diameter less than 0.2 mm and possess a hollow spherical shape filled with air or other inert gas. Examples of such a material may include but not limited to glass bubbles (marketed by 3M), fly ash cenospheres (by-product of coal power plant). Super fine grade vermiculite were also used in addition to microspheres to facilitate sprayability of SFR-ECC. The particle size of vermiculite should be kept small (e.g. less than 2 mm).

Polymeric materials, for example, acrylic latex, can be used as admixtures in the SFR-ECC mixtures to facilitate adhesion onto the steel substrate. However, the polymer (solid) to cement ratio should be kept low (<10%) to retain its inflammable nature.

Short randomly distributed fibers are used as reinforcement to achieve sufficient fiber bridging capacity. The volume percentage of the fiber is kept under 3% (as low as 0.7% by volume fraction) in this invention. Fibers of diameters ranging from 10-50 μm and length ranging from 6-12 mm are used and the aspect ratio of the fibers must be high enough (e.g. >200) to achieve sufficient bridging force with the matrix. Fiber selections include but not limited to polyvinyl alcohol and high tenacity PP fiber.

Water/cement ratio is high (greater than 1) in SFR-ECC to achieve property fresh property.

The dry density range of SFR-ECC is within 400-800 kg/m$^3$.

CONCLUSIONS

According to the principles of the present teachings, the unique durability mechanisms and potential applications of SFR-ECC have been emphasized. The following conclusions can be drawn:

1. SFR-ECC exhibits significantly better cohesive and adhesive characteristics compared to conventional SFRM. The desirable cohesive and adhesive characteristics are maintained even under high rate loading.

2. The unique cohesive characteristics of SFR-ECC enable extra durability mechanisms facilitated by enclosed configuration or mechanical anchorage. Therefore SFR-ECC has higher tolerance to local and global adhesive failure and shows more robust durability performance.

3. The unique properties of SFR-ECC offer great versatility in construction methodology. In addition to spray-on application, SFR-ECC also can be used to pre-fireproof steel members and as pre-cast fire-resistive boards.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fiber reinforced cement-based composite comprising:
a cement material;
a water having a water to cement weight ratio greater than one thereby forming a cement matrix;
an air void structure system having air pores in the range of 0.2-0.7 mm formed due to air entrainment within said cement matrix;
a lightweight aggregate each having a diameter less than 200 μm, said lightweight aggregate having air or inert gas disposed within said aggregate, a density of said aggregate ranging from 200-900 kg/m$^3$, a volume of said aggregate ranging from 15% to 50% of the total volume of the composite;

short randomly distributed fibers having a volume fraction of less than 4% by volume fraction, said fibers having a diameter between 10 and 50 μm and a length between 6 and 12 mm;

super fine grade vermiculite with particle size less than 1.5 mm, a vermiculite to cement weight ratio being 20 to 40% of cement;

a bonding agent having a bonding agent to cement weight ratio lower than 10%; and a superplasticizer and viscosity modifying agent for rheology control.

2. The composite according to claim 1 wherein said composite having dry density of 352-1280 kg/m$^3$.

3. The composite according to claim 2 wherein said composite having dry density of 400-800 kg/m$^3$.

4. The composite according to claim 1 wherein said composite having tensile strength of 0.5-3 MPa.

5. The composite according to claim 1 wherein said composite having tensile strain capacity of at least 0.75%.

6. The composite according to claim 1 wherein said composite is sprayable.

7. The composite according to claim 1 wherein said composite is castable.

8. The composite according to claim 1 wherein said composite is hand trowelable.

9. The composite according to claim 1 wherein said composite can be shaped using a tile-saw.

10. The composite according to claim 1 wherein said composite can be shaped using a hand saw.

11. The composite according to claim 1 wherein said composite can be shaped using a craft knife.

12. The composite according to claim 1 wherein said fibers comprise polyvinyl alcohol fibers.

13. The composite according to claim 1 wherein said fibers comprise high tenacity polypropylene fibers.

14. The composite according to claim 1 wherein said bonding agent comprises acrylic latex polymer.

15. The composite according to claim 1 wherein said lightweight aggregate comprises inert hollow microspheres.

* * * * *